(12) United States Patent
Kalgaonkar et al.

(10) Patent No.: US 11,746,279 B2
(45) Date of Patent: *Sep. 5, 2023

(54) FRACTURING FLUIDS BASED ON VISCOELASTIC SURFACTANTS

(71) Applicants: SAUDI ARABIAN OIL COMPANY, Dhahran (SA); KING FAHD UNIVERSITY OF PETROLEUM & MINERALS, Dhahran (SA)

(72) Inventors: Rajendra Arunkumar Kalgaonkar, Dhahran (SA); Eyad Alali, Dammam (SA); Mohammed Abudullah Bataweel, Dhahran (SA); Nisar Ullah, Dhahran (SA); Muhammad Mansha, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,719

(22) Filed: Nov. 12, 2021

(65) Prior Publication Data

US 2023/0159816 A1    May 25, 2023

(51) Int. Cl.
    *C09K 8/62*    (2006.01)
    *C09K 8/80*    (2006.01)

(52) U.S. Cl.
    CPC .............. *C09K 8/62* (2013.01); *C09K 8/80* (2013.01); *C09K 2208/30* (2013.01)

(58) Field of Classification Search
    CPC .......... C09K 8/60; C09K 8/602; C09K 8/604; C09K 8/84; C09K 8/86; C09K 8/845; E21B 43/26; E21B 43/267
    See application file for complete search history.

(56) References Cited

U.S. PATENT DOCUMENTS

| | | | |
|---|---|---|---|
| 6,302,209 B1 | 10/2001 | Thompson, Sr. et al. | |
| 7,237,608 B2 | 7/2007 | Fu et al. | |

(Continued)

FOREIGN PATENT DOCUMENTS

| | | | | |
|---|---|---|---|---|
| CN | 112812076 A | * | 5/2021 | ........... C07D 295/13 |
| EP | 0 439 186 A2 | * | 1/1991 | ........... C07C 309/14 |
| EP | 3 071 665 A2 | | 9/2016 | |

OTHER PUBLICATIONS

Zhang et al. Development of a Stimuli-Responsive Gemini Zwitterionic Viscoelastic Surfactant for Self-Diverting Acid, Feb. 2019, J Surfactant Detergent, 22, 535-547 (Year: 2019).*

(Continued)

*Primary Examiner* — Angela M DiTrani Leff
(74) *Attorney, Agent, or Firm* — Osha Bergman Watanabe & Burton LLP

(57) ABSTRACT

A fracturing fluid may include a first surfactant and a second surfactant. The first surfactant may have a structure represented by formula (I):

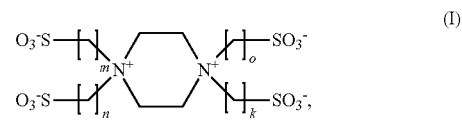

wherein m is an integer ranging from 2 to 3, and n, o, and k are each, independently, integers ranging from 2 to 10. The second surfactant having a structure represented by Formula (II):

(Continued)

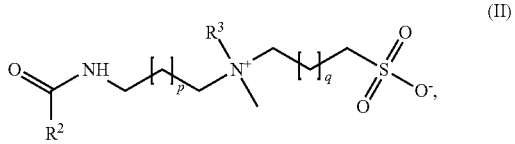

(II)

wherein $R^2$ is a $C_{15}$-$C_{27}$ hydrocarbon group or a $C_{15}$-$C_{29}$ substituted hydrocarbon group, $R^3$ is a $C_1$-$C_{10}$ hydrocarbon group, and p and q are each, independently, an integer ranging from 1 to 4. Methods of treating a hydrocarbon-bearing formation include injecting the fracturing fluid in the hydrocarbon-bearing formation, the fracturing fluid being configured to transport a proppant in fractures of the hydrocarbon-bearing formation.

11 Claims, 3 Drawing Sheets

(56) References Cited

U.S. PATENT DOCUMENTS

| | | | |
|---|---|---|---|
| 7,621,334 | B2 | 11/2009 | Welton et al. |
| 8,183,181 | B1 | 5/2012 | Gupta et al. |
| 9,650,558 | B2 | 5/2017 | Gupta et al. |
| 10,479,762 | B1 | 11/2019 | Hussain et al. |
| 11,203,712 | B1 | 12/2021 | Kalgaonkar et al. |
| 2004/0214725 | A1 | 10/2004 | Moss |
| 2005/0233911 | A1 | 10/2005 | Samuel |
| 2005/0252658 | A1 | 11/2005 | Willingham et al. |
| 2006/0105919 | A1 | 5/2006 | Colaco et al. |
| 2007/0167332 | A1 | 7/2007 | Subramanian et al. |
| 2009/0065204 | A1 | 3/2009 | Dahanayake et al. |
| 2009/0275490 | A1 | 11/2009 | Milne et al. |
| 2010/0056402 | A1 | 3/2010 | Li et al. |
| 2010/0122815 | A1 | 5/2010 | Zamora et al. |
| 2010/0197530 | A1* | 8/2010 | Gupta ............... C09K 8/68 507/236 |
| 2011/0092398 | A1 | 4/2011 | Dahanayake et al. |
| 2011/0152135 | A1 | 6/2011 | Chen et al. |
| 2012/0085534 | A1 | 4/2012 | Morvan et al. |
| 2015/0072905 | A1 | 3/2015 | Hartshorne et al. |
| 2016/0257873 | A1 | 9/2016 | Cadix |
| 2017/0327733 | A1* | 11/2017 | Li ............... C09K 8/68 |
| 2020/0263077 | A1 | 8/2020 | Hussain et al. |
| 2021/0380867 | A1 | 12/2021 | Kalgaonkar et al. |
| 2021/0380871 | A1* | 12/2021 | Kalgaonkar ............ C09K 8/68 |

OTHER PUBLICATIONS

Translation of CN 112812076 A (Year: 2021).*
Arian, Fatemeh et al., "Novel Sultone Based Bronsted Acidic Ionic Liquids with Perchlorate Counter-Anion for One-pot Synthesis of 2H-indazolo[2,1-b]phthalazine-triones"; Journal of Molecular Structure; vol. 1229, Article 129599; pp. 1-23; Apr. 5, 2021 (24 pages).
Chu, Zonglin et al., "A Facile Route towards the Preparation of Ultra-Long-Chain Amidosulfobetaine Surfactants"; Synlett; vol. 2009, Issue 16; pp. 2655-2658; Sep. 9, 2009 (4 pages).
Chu, Zonglin et al., "Empirical Correlations between Krafft Temperature and Tail Length for Amidosulfobetaine Surfactants in the Presence of Inorganic Salt"; Langmuir; vol. 28, Issue 2; pp. 1175-1181; Dec. 7, 2011 (7 pages).
Hussain, S.M. Shakil et al., "Effect of internal olefin on the properties of betaine-type zwitterionic surfactants for enhanced oil recovery"; Journal of Molecular Liquids; vol. 266; pp. 43-50; Sep. 15, 2018 (8 pages).
Kamal, Muhammad Shahzad et al., "A Zwitterionic Surfactant Bearing Unsaturated Tail for Enhanced Oil Recovery in High-Temperature High-Salinity Reservoirs"; Journal of Surfactants and Detergents; vol. 21, Issue 1; pp. 165-174; Feb. 21, 2018 (10 pages).
Köberle, P. et al., "Hydeophobically Modified Zwitterionic Polymers: Synthesis, Bulk Properties, and Miscibility with Inorganic Salts"; Macromolecules; vol. 27, Issue 8; pp. 2165-2173; Apr. 1, 1994 (9 pages).
Li, Ping et al., "Membrane Surface Engineering with Bifunctional Zwitterions for Efficient Oil-Water Separation"; ACS Applied Materials & Interfaces; vol. 11, Issue 34; pp. 31328-31337; Aug. 28, 2019 (10 pages).
Mansha, Muhammad et al., "Synthesis, Characterization, and Viscosification of Amidosulfobutaine and Zwitterionic Gemini Surfactants"; Journal of Surfactants and Detergents; vol. 24, Issue 4; pp. 697-706; Nov. 20, 2020 (10 pages).
Zhao, Liqiang et al., "A review of diverting agents for reservoir stimulation"; Journal of Petroleum Science and Engineering; vol. 187, Article 106734; pp. 1-18; Apr. 2020 (21 pages).

* cited by examiner

FRACTURING FLUIDS BASED ON VISCOELASTIC SURFACTANTS

BACKGROUND

Hydraulic fracturing is used in the oil and gas industry to stimulate production in hydrocarbon-containing formations. The fracturing is created after drilling a well by injecting suitable fluids such as water or chemicals into the well under pressure to induce fractures in a formation. A variety of fluids has been developed to withstand the high pump rates, shear stresses, and high temperatures and pressures a fracturing fluid may be exposed to. In particular, hydraulic fracturing fluids may be aqueous-based gels, emulsions, or foams.

Hydraulic fracturing fluids may also contain proppants including solid proppants such as sand ("frac sand") or ceramic beads to hold open fractures created in the formation. In such hydraulic fracturing fluids, complex chemical mixtures having sufficient viscosity properties may be included to generate fracture geometry in the formation rock and transport solid proppants holding the fracture open. In this context, the viscosity of the hydraulic fracturing fluids may impact the fracture initiation, propagation and resulting dimensions.

SUMMARY

This summary is provided to introduce a selection of concepts that are further described in the detailed description. This summary is not intended to identify key or essential features of the claimed subject matter, nor is it intended to be used in limiting the scope of the claimed subject matter.

In one aspect, embodiments disclosed herein relate to fracturing fluids including a first surfactant having a structure represented by Formula (I):

where m is an integer ranging from 2 to 3, and n, o, and k are each, independently, integers ranging from 2 to 10, and a second surfactant having a structure represented by Formula (II):

wherein $R^2$ is a $C_{15}$-$C_{27}$ hydrocarbon group or a $C_{15}$-$C_{29}$ substituted hydrocarbon group, $R^3$ is a $C_1$-$C_{10}$ hydrocarbon group, and p and q are each, independently, an integer ranging from 1 to 4.

In another aspect, embodiments disclosed herein relate to fracturing fluids including a first surfactant having a structure represented by Formula (III):

and
a second surfactant has a structure represented by Formula (IV):

In another aspect, embodiments disclosed herein relate to methods of treating a hydrocarbon-bearing formation including injecting a fracturing fluid in the hydrocarbon-bearing formation. The fracturing fluid may include first surfactant having a structure represented by Formula (I) and a second surfactant having a structure represented by Formula (II).

In another aspect, embodiments disclosed herein relate to methods of treating a hydrocarbon-bearing formation including injecting a fracturing fluid in the hydrocarbon-bearing formation. The fracturing fluid may include first surfactant having a structure represented by Formula (III) and a second surfactant having a structure represented by Formula (IV).

Other aspects and advantages of the claimed subject matter will be apparent from the following description and the appended claims.

DETAILED DESCRIPTION

Embodiments in accordance with the present disclosure generally relate to composition and method of making high temperature fracturing fluid formulations and methods of treating hydrocarbon-bearing formation using these fracturing fluids. These fracturing fluids may contain surfactant mixtures. The surfactants may be viscoelastic. The formulations may include a piperazine-based surfactant molecule such as 3,3',3",3"'-(piperazine-1,4-diium-1,1,4,4-tetrayl)tetrakis(propane-1-sulfonate). In addition, the formulations may include a zwitterionic surfactant molecule such as 3-(metheyliumyl(methyl)(3-stearamidopropyl)-14-azaneyl)propane-1-sulfonate.

Methods according to one or more embodiments may involve injecting the fracturing fluids into a hydrocarbon-bearing formation, such that the fracturing fluids are configured to transport a proppant in fractures of the hydrocarbon-bearing formation. The fracturing fluids may be low-viscosity aqueous solutions that increase in viscosity under downhole conditions. The fracturing fluids may demonstrate increased stability under high temperature and pressure conditions, making them highly suitable for use in downhole environments. When the fracturing fluid contacts a produced hydrocarbon, its viscosity may drastically reduce, enabling easy flowback of the fluid post treatment. As the viscosifying material used in the present disclosure does not contain any solid particulates, it will be potentially non-damaging to the formation due to effective flowback and no residual deposition inside the formation.

One or more embodiments of the present disclosure relate to a fracturing fluid comprising a first surfactant and a second surfactant. The fracturing fluid may further include a proppant. The fracturing fluid may also include an activator and an aqueous base fluid. The first surfactant may be a piperazine-based surfactant having a structure represented by Formula (I):

where m is an integer ranging from 2 to 3, and n, o, and k are each, independently, integers ranging from 2 to 10.

In some embodiments, the first surfactant may be a piperazine-based surfactant such as 3,3',3'',3'''-(piperazine-1,4-diium-1,1,4,4-tetrayl)tetrakis(propane-1-sulfonate) having a structure represented by Formula (III):

In one or more embodiments, the first surfactant may be thermally stable at a temperature of 200° C. or more, 250° C. or more, 300° C. or more, or 350° C. or more, as measured by thermogravimetric analysis (TGA).

In one or more embodiments, the first surfactant may be highly soluble in aqueous solutions, such as in deionized water, seawater, brines, calcium chloride solutions, and the like. In some embodiments, the first surfactant may be soluble in aqueous solutions in an amount of 10% by weight (wt. %) or more, 20 wt. % or more, 30 wt. % or more, or 40 wt. % or more at ambient temperature. In some embodiments, the solubility of the first surfactant may increase with increasing temperature, until gelation occurs.

The fracturing fluids of one or more embodiments may comprise the first surfactant in an amount of the range of about 1 to 15% by weight (wt. %). For example, the fracturing fluid may contain the first surfactant in an amount ranging from a lower limit of any of 1, 1.5, 2, 2.5, 3, 4, 5, 7, 10, and 12 wt. % to an upper limit of any of 1.5, 2, 3, 4, 5, 6, 8, 10, 12, 14, and 15 wt. %, where any lower limit can be used in combination with any mathematically-compatible upper limit.

The fracturing fluid may also include a second surfactant. The second surfactant may be a zwitterionic surfactant having a structure represented by Formula (II):

where $R^2$ is a $C_{15}$-$C_{27}$ hydrocarbon group or a $C_{15}$-$C_{29}$ substituted hydrocarbon group, $R^3$ is a $C_1$-$C_{10}$ hydrocarbon group, and p and q are each, independently, an integer ranging from 1 to 4.

In reference to $R^2$ and $R^3$, the term "hydrocarbon group" has the same meaning as discussed above with regard to $R^1$. As used with regard to $R^2$, the term "substituted hydrocarbon group" refers to a hydrocarbon group (as defined above) where at least one hydrogen atom is substituted with a non-hydrogen group that results in a stable compound. Such substituents may be groups selected from, but not limited to, halo, hydroxyl, alkoxy, oxo, alkanoyl, aryloxy, alkanoyloxy, amino, alkylamino, arylamino, arylalkylamino, disubstituted amines, alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide, substituted sulfonamide, nitro, cyano, carboxy, carbamyl, alkoxycarbonyl, aryl, substituted aryl, guanidine, and heterocyclyl, and mixtures thereof. In some embodiments, the substituted hydrocarbon group may comprise one or more alkylene oxide units. The alkylene oxide may be ethylene oxide.

In one or more embodiments, the zwitterionic surfactant may be soluble in aqueous solutions, such as in deionized water, seawater, brines, calcium chloride solutions, and the like. In some embodiments, the zwitterionic surfactant may be soluble in aqueous solutions in an amount of 10% by weight (wt. %) or more, 20 wt. % or more, or 30 wt. % or more at ambient temperature. In some embodiments, the zwitterionic surfactant may have a lower aqueous solubility than the piperazine-based surfactant. In some embodiments, the solubility of the zwitterionic surfactant may increase with increasing temperature, until gelation occurs.

In some embodiments, the second surfactant in the fracturing fluid may be a zwitterionic surfactant having a structure represented by Formula (IV):

In some embodiments, the zwitterionic surfactant may be soluble in aqueous solutions, such as in deionized water, seawater, or $CaCl_2$) solutions, in an amount of 0 wt. % to about 30 wt. % The solubility increases with increasing temperatures. In addition, the thermogravimetric analysis of the zwitterionic surfactant of Formula (IV) showed that this zwitterionic surfactant is stable up to 350° C., without appreciable loss of weight.

The fracturing fluids of one or more embodiments may comprise the second surfactant in an amount of the range of about 1 to 15% by weight (wt. %). For example, the fracturing fluid may contain the second surfactant in an amount ranging from a lower limit of any of 1, 1.5, 2, 2.5, 3, 4, 5, 7, 10, and 12 wt. % to an upper limit of any of 1.5, 2, 3, 4, 5, 6, 8, 10, 12, 14, and 15 wt. %, where any lower limit can be used in combination with any mathematically-compatible upper limit.

In one or more embodiments, the fracturing fluid may comprise the first surfactant and the second surfactant in a weight ratio of 1:5 to 5:1 by weight, where the weight ratio is given as the weight of the first surfactant to the weight of the second surfactant. For example, the fracturing fluid may contain the first surfactant and the second surfactant in a weight ratio ranging from a lower limit of any of 1:5, 1:4, 1:3, 1:2, 1:1, and 2:1, to an upper limit of any of 1:2, 1:1, 2:1, 3:1, 4:1, and 5:1, where any lower limit can be used in combination with any mathematically-compatible upper limit.

The fracturing fluids of one or more embodiments may have a total surfactant content, including both the first and second surfactant, in an amount of the range of about 2 to 30% by weight (wt. %). For example, the fracturing fluid may have a total surfactant content in an amount ranging from a lower limit of any of 2, 2.5, 3, 4, 5, 7, 10, 12, 15, 20, and 25 wt. % to an upper limit of any of 1.5, 2, 3, 4, 5, 6, 8, 10, 12, 15, 20, 25, and 30 wt. %, where any lower limit can be used in combination with any mathematically-compatible upper limit.

The fracturing fluids of one or more embodiments may include, for example, water-based fracturing fluids. The fracturing fluids may be acid stimulation fluids or EOR fluids or among others. In one or more embodiments, the water-based fracturing fluids may comprise an aqueous fluid. The aqueous fluid may include at least one of fresh water, seawater, brine, water-soluble organic compounds, and mixtures thereof. The aqueous fluid may contain fresh water formulated to contain various salts in addition to the first or second salt, to the extent that such salts do not impede the desired nitrogen-generating reaction. The salts may include, but are not limited to, alkali metal halides and hydroxides. In one or more embodiments, brine may be any of seawater, aqueous solutions wherein the salt concentration is less than that of seawater, or aqueous solutions wherein the salt concentration is greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the aqueous fluid may be controlled by increasing the salt concentration in the brine, though the maximum concentration is determined by the solubility of the salt. In particular embodiments, brine may include an alkali metal halide or carboxylate salt and/or alkaline earth metal carboxylate salts.

The fracturing fluids may include an activator. The activator is an additive that, upon an increase in temperature, enables the surfactant to exhibit viscoelastic behavior and cause the fracturing fluid to increase in viscosity. Without being bound by any theory, the activators disclosed herein may enable the surfactant micelles to form a rod-shaped structure that entangle as the temperature of the fluid increases. This entanglement is the cause of the viscoelastic behavior and the increase in viscosity.

In one or more embodiments, the activator may be a salt. The salt may, for instance comprise a monovalent cation, such as an alkali metal or a Group 11 transition metal, or a divalent cation, such as an alkaline earth metal or a transition metal. In some embodiments, the salt may comprise a cation selected from the group consisting of lithium, sodium, potassium, magnesium, calcium, nickel, iron, tin, aluminum, and zinc. In some embodiments, the salt may comprise an anion selected from the group consisting of fluoride, chloride, bromide, carbonate, bicarbonate, sulfate, nitrate, nitrite, chromate, sulfite, oxalate, phosphate, and phosphite. In particular embodiments, the activator may be an alkaline earth metal halide, such as calcium chloride.

The fracturing fluids of one or more embodiments may comprise an activator in an amount of the range of about 5 to 30% by weight (wt %). For example, the fracturing fluid may contain the activator in an amount ranging from a lower limit of any of 5, 6, 7, 8, 10, 12, 15, 17, 20, and 22 wt % to an upper limit of any of 10, 12, 15, 17, 20, 22, 25, 27, and 30 wt %, where any lower limit can be used in combination with any mathematically-compatible upper limit.

In one or more embodiments, the fracturing fluid may comprise an activator and the surfactants in a weight ratio of 30:1 to 1:3, by weight, where the weight ratio is given as the weight of the activator to the total weight of the surfactants. For example, the fracturing fluid may contain the activator and the surfactants in a weight ratio ranging from a lower limit of any of 1:3, 1:2, 1:1, 2:1, 4:1, 6:1, 8:1, 10:1 and 12:1 to an upper limit of any of 1:1, 2:1, 4:1, 6:1, 8:1, 10:1, 12:1, 15:1, 20:1, 25:1, and 30:1, where any lower limit can be used in combination with any mathematically-compatible upper limit.

The fracturing fluids may be used alone to fracture the formation. Alternatively, they may be used with a sufficient quantity of a proppant. Such proppants may include gravel, sand, bauxite, or glass beads. Proppants may be uncoated or coated with resins such as epoxy, furan, novolak, polyepoxide resins, furan/furfuryl alcohol resins, phenoloic resins, urea-aldehyde resins, urethane resins, phenolic/latex resins, phenol formaldehyde resins, polyester resins and acrylate resins and copolymers and mixtures thereof, The particle size of the proppants may be from about 2 to about 400 mesh U.S. Sieve Series. The resulting fluid slurry may have a weight of particulate material per gallon of slurry ranging from as low as about 1 ppg, up to about 20 ppg, or from about 5 ppg to about 20 ppg. Ppg is pounds of proppant to gallons of fracturing fluid.

The fracturing fluids may also include one or more acids. Acids may be particularly included when the fracturing fluid is to be used in a matrix stimulation process, as described below. The acid may be any suitable acid known to a person of ordinary skill in the art, and its selection may be determined by the intended application of the fluid. In some embodiments, the acid may be one or more selected from the group consisting of hydrochloric acid, sulfuric acid, carboxylic acids such as acetic acid, and hydrofluoric acid. In some embodiments, the hydrofluoric acid may be included as a hydrogen fluoride source, such as ammonium fluoride, ammonium bifluoride, fluoroboric acid, hexafluorophosphoric acid, and the like.

The fracturing fluid of one or more embodiments may comprise the one or more acids in a total amount of the range of about 0.01 to 30.0 wt. %. For example, the fracturing fluid may contain the acids in an amount ranging from a lower limit of any of 0.01, 0.05, 0.1, 0.5, 1.0, 5.0, 10, 15, 20, and 25 wt. % to an upper limit of any of 0.5, 1.0, 5.0, 10, 15, 20, 25, and 30 wt. %, where any lower limit can be used in combination with any mathematically-compatible upper limit.

The fracturing fluids of one or more embodiments may include one or more additives. The additives may be any conventionally known and one of ordinary skill in the art will, with the benefit of this disclosure, appreciate that the selection of said additives will be dependent upon the intended application of the fracturing fluid. In some embodiments, the additives may be one or more selected from clay stabilizers, scale inhibitors, corrosion inhibitors, biocides, friction reducers, thickeners, fluid loss additives, and the like.

The fracturing fluid of one or more embodiments may comprise the one or more additives in a total amount of the range of about 0.01 to 15.0 wt. %. For example, the fracturing fluid may contain the additives in an amount ranging from a lower limit of any of 0.01, 0.05, 0.1, 0.5, 1.0, 2.5, 5.0, 1.5, 10.0 and 12.5 wt. % to an upper limit of any of 0.1, 0.5, 1.0, 2.5, 5.0, 7.5, 10.0, 12.5, 15.0, 20.0 and 30.0 wt. %, where any lower limit can be used in combination with any mathematically-compatible upper limit.

In one or more embodiments, the fracturing fluid may contain little to no solid material. For example, the fracturing fluids of some embodiments may contain solid material in an amount of 2 wt. % or less, 1 wt. % or less, 0.5 wt. % or less, 0.1 wt. % or less, 0.05 wt. % or less, 0.01 wt. % or less, or 0.001 wt. % or less.

In one or more embodiments, the fracturing fluid may have a density that is greater than 0.90 $g/cm^3$. For example, the fracturing fluid may have a density that is of an amount ranging from a lower limit of any of 0.90, 0.95, 1.00, 1.05, 1.10, 1.15, and 1.20 $g/cm^3$ to an upper limit of any of 1.00, 1.05, 1.10, 1.15, 1.20, and 1.25 $g/cm^3$, where any lower limit can be used in combination with any mathematically-compatible upper limit.

In one or more embodiments, the fracturing fluid may have a viscosity at 90° C. of at least about 300 cP. In particular, the fracturing fluid may have a viscosity at 90° C. of at least about 300 cP when the mixture is at a constant shear rate of 35 $s^{-1}$. For example, the fracturing fluid may have a viscosity at 90° C., when the mixture is at a constant shear rate of 35 $s^{-1}$, that is of an amount ranging from a lower limit of any of 300, 305, 310, 315, 320, 325, 330, 335, 340 cP to an upper limit of any of 350, 355, 360, 365, 370, 375, 380, 385, 390, 395, and 400 cP, where any lower limit can be used in combination with any mathematically-compatible upper limit. In some embodiments, the fracturing fluids may have a viscosity at 90° C., when the mixture is at a constant shear rate of 35 $s^{-1}$, of 325 cP or more, 330 cP or more, 335 cP or more, or 340 cP or more, or 350 cP or more.

The fracturing fluids may be prepared in any suitable manner. For example, the surfactants may be blended in water to the desired viscosity. The activator and/or salt solution may then be added. The fracturing fluids can also be prepared by adding the surfactants to an activator and/or salt solution. Thus, the components of the fracturing fluid may be added in any order. Standard mixing techniques may be used.

A formation may be fractured by using the fracturing fluids according to one or more embodiments. The fracturing fluid may be injected into the wellbore at a pressure that may overcome the native overburden pressure of the formation, thus resulting in fracturing. The well may first be treated with a salt solution to help stabilize the formation prior to injection of the fracturing fluids.

Methods in accordance with the present disclosure may include the injection of a fracturing fluid into a formation. In one or more embodiments, the fracturing fluid may be a single treatment fluid that is injected into the wellbore in one pumping stage. In other embodiments, methods in accordance with one or more embodiments may involve the injection of the fracturing fluid and one or more additional stimulation fluids. The additional stimulation fluids may, in some embodiments, be co-injected with the fracturing fluid. In some embodiments, the stimulation fluids may be injected after the fracturing fluid.

The fracturing fluid of one or more embodiments has a low viscosity at low temperatures and, therefore, good injectivity, while being thermally stable enough for use downhole. Upon exposure to increased temperatures in the wellbore, the fracturing fluid may increase in viscosity. This phenomenon has the effect of reducing fluid mobility, resulting in diverting the flow from high permeability zones to lower ones and, ultimately, providing improved oil recovery.

The methods of one or more embodiments of the present disclosure may further comprise a pre-flushing step before the injection of the fracturing fluid. The pre-flushing step may comprise flushing the formation with a flushing solution that comprises one or more surfactants. The flushing solution may be an aqueous solution, and the surfactant may be the same surfactants as included in the fracturing fluid. The pre-flushing may limit the adsorption of the surfactants on the rock surface of the formation during the injection process. The suitability of the use of a pre-flushing step may depend on the type of surfactant and rock.

The hydrocarbon-containing formation of one or more embodiments may be a formation containing multiple zones of varying permeability. For instance, the formation may contain at least a zone having a relatively higher permeability and a zone having a relatively lower permeability. During conventional injection, fluids preferentially sweep the higher permeability zone, leaving the lower permeability zone incompletely swept. In one or more embodiments, the increased viscosity of the fracturing fluid may "plug" the higher permeability zone, allowing subsequent fluid to sweep the low permeability zone and improving sweep efficiency.

In one or more embodiments, the formation may have a temperature ranging from about 60 to 250° C. For example, the formation may have a temperature that is of an amount ranging from a lower limit of any of 60, 70, 80, 90, 100, 120, 140, 160, 180, and 200° C. to an upper limit of any of 100, 120, 140, 160, 180, 200, 225, and 250° C., where any lower limit can be used in combination with any mathematically-compatible upper limit.

The methods of one or more embodiments may be used for well stimulation. A well stimulation process in accordance with one or more embodiments of the present disclosure may include the step of injecting the fracturing fluid into a hydrocarbon-bearing formation at an injection well. In some embodiments, the injection of the fracturing fluid may be performed at a pressure that is below the fracturing pressure of the formation. A zone within the formation may be at a high temperature and increase the viscosity of the fracturing fluid. After the increase in viscosity, the tail-end of the fluid is diverted to lower-permeability zones of the formation, displacing hydrocarbons. This results from the increase in viscosity that may "plug" the more permeable zones of the formation. The formation may be stimulated by the fracturing fluid, creating pathways for hydrocarbon production. According to some embodiments, the displaced hydrocarbons may be recovered through the stimulated reservoir. In one or more embodiments, the hydrocarbons may be recovered at a production well.

The well stimulation process of one or more embodiments may be a matrix stimulation process. In the matrix stimulation process of one or more embodiments, the fracturing fluid, or one of the stimulation fluids, contains an acid. The acid fluid may react with the formation, dissolving rock, and creating wormholes that create a pathway for hydrocarbons to be displaced from deeper within the rock. In one or more embodiments, the fracturing fluid may increase in viscosity in the formation, enabling the fluid to better penetrate lower-permeability zones of the formation and allowing the acid to more uniformly react with the entire formation. This may provide for the formation of deeper wormholes and enhancing the overall permeability of the near-wellbore region. In the absence of this viscosity increase, the fluid will primarily penetrate the high permeability zones.

In one or more embodiments, the well stimulation process may be repeated one or more times to increase the amount of hydrocarbons recovered. In some embodiments, subsequent well stimulation processes may involve the use of different amounts of the surfactant and/or different surfactants than the first. The methods of one or more embodiments may advantageously provide improved sweep efficiency.

EXAMPLES

The following examples are merely illustrative and should not be interpreted as limiting the scope of the present disclosure.

Piperazine-Based Surfactant

A piperazine-based surfactant 3,3',3",3'''-(piperazine-1,4-diium-1,1,4,4-tetrayl)tetrakis(propane-1-sulfonate) of Formula (III) was used in the following Examples.

The piperazine-based surfactant (III) had the following NMR and FTIR characterization data. $^1$H-NMR [D$_2$O]= 2.096 (m, 8H), 2.914 (t, 8H), 3.240 (t, 8H), 3.51 (t, 8H); $^{13}$C-NMR [D$_2$O]=20.23, 48.36, 49.82, 56.11. FTIR (cm$^{-1}$)= 3007.99, 2978.34, 1447.37, 1239.18, 1215.18, 1143.90, 952.86, 787.80.

Figure 1:
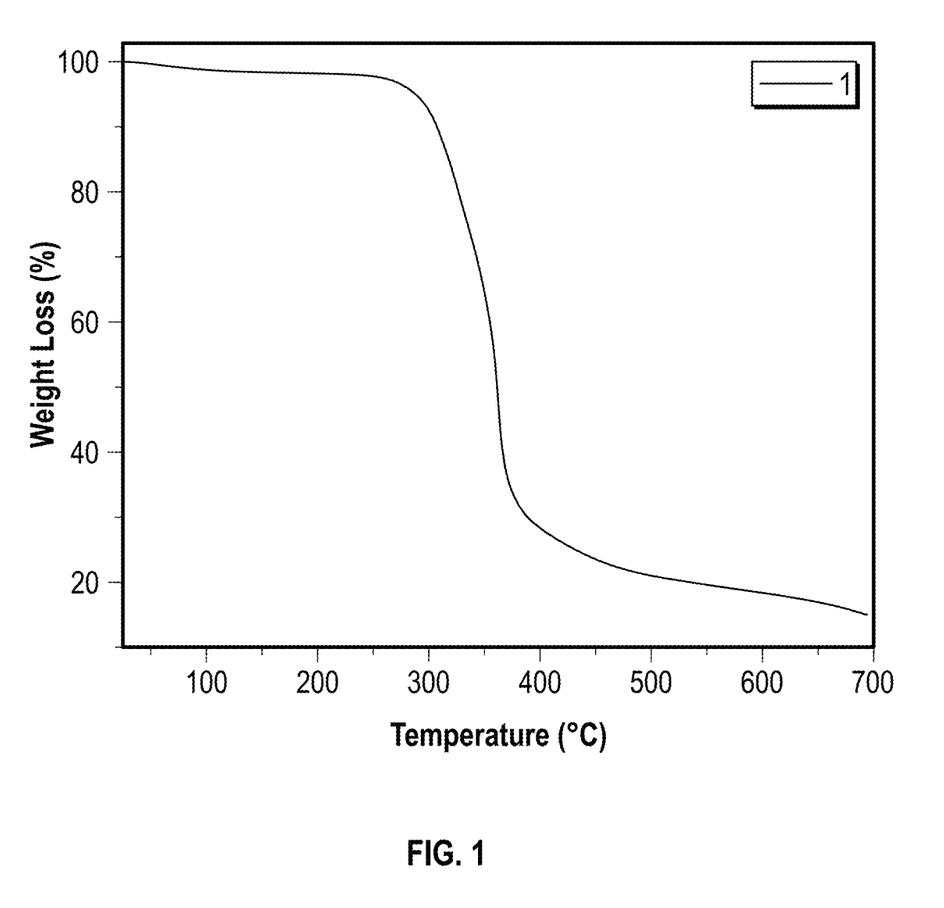
FIG. 1 is a graph of the thermogravimetric analysis (TGA) of piperazine-based surfactant 3,3',3",3"'-(piperazine-1,4-diium-1,1,4,4-tetrayl)tetrakis(propane-1-sulfonate).

As shown in FIG. 1, the thermogravimetric analysis (TGA) of the piperazine-based surfactant (III) showed a high thermal stability with an onset of decomposition temperature (Td) at 350° C. and an abrupt loss in weight above the Td indicating the decomposition of the main chain of surfactant.

Zwitterionic Surfactant

A zwitterionic surfactant 3-(metheyliumyl(methyl)(3-stearamidopropyl)-14-azaneyl)propane-1-sulfonate of Formula (IV) was also used with the piperazine-based surfactant (III) in the following Examples. This zwitterionic surfactant (IV) was synthesized using the methodology described in Chu et. al., A facile route towards the preparation of ultra-long-chain amidosulfobetaine surfactants, Synlett 2009, 2655-2658.

Viscosification Experiments

The viscosity behavior of neat piperazine-based surfactant of Formula (III) was studied in presence of CaCl$_2$) activator. The results showed that the surfactant of Formula (III) did not exhibit any appreciable viscosity change with increasing temperatures. The solution of this surfactant in water remained like the intact water liquid.

However, as shown in Table 1, the viscosity of a formulation prepared from a mixture of piperazine-based surfactant of Formula (III) and zwitterionic surfactant of Formula (IV) in a 1:1 ratio in presence of CaCl$_2$) activator displayed an increase in the viscosity of the mixture upon increasing temperatures.

TABLE 1

| | Viscosity Results in CaCl$_2$ solutions | | | | | |
|---|---|---|---|---|---|---|
| Shear Rate | Viscosity of 10% CaCl$_2$ solution (cPs) | | | Viscosity of 20% CaCl$_2$ solution (cPs) | | |
| (s$^{-1}$) | RT | 40° C. | 90° C. | RT | 40° C. | 90° C. |
| 1.02 | 24.32 | 7.81 | 6047 | 15.23 | 15.76 | 2891 |
| 5.00 | 7.64 | 4.33 | 1374 | 10.33 | 7.91 | 733.4 |
| 10.00 | 6.56 | 3.19 | 742.4 | 7.28 | 6.32 | 411.8 |
| 15.00 | 6.12 | 3.12 | 510.5 | 6.54 | 5.47 | 292.2 |
| 20.00 | 5.37 | 2.87 | 393.9 | 5.18 | 4.56 | 243.5 |
| 25.00 | 4.78 | 2.79 | 380.2 | 4.67 | 4.09 | 232.7 |
| 35.00 | 4.34 | 1.61 | 354.3 | 3.89 | 3.9 | 209.9 |

Figure 2:
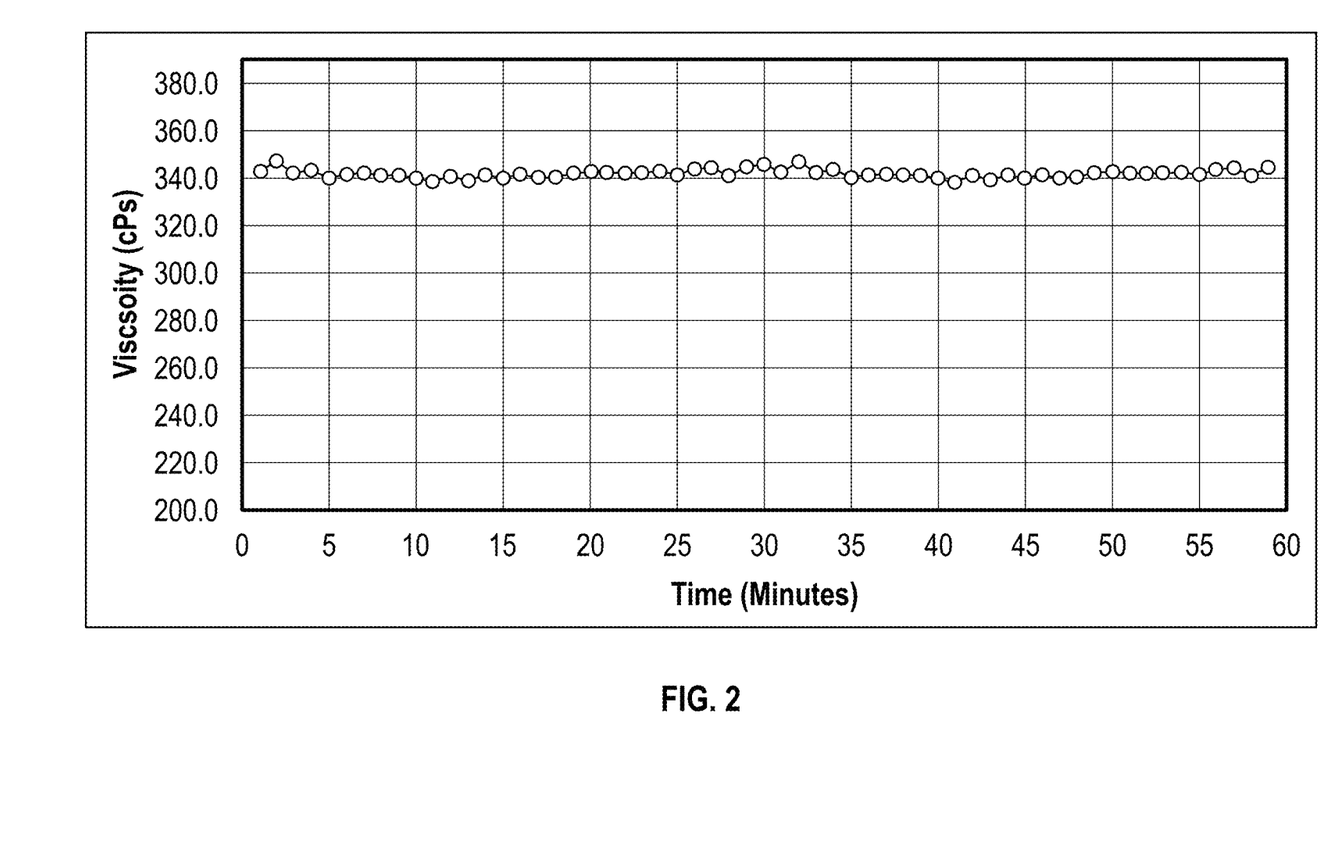
FIG. 2 is graph showing the viscosity profile of a mixture of piperazine-based surfactant 3,3',3",3"'-(piperazine-1,4-diium-1,1,4,4-tetrayl)tetrakis(propane-1-sulfonate) in combination with zwitterionic surfactant 3-(metheyliumyl (methyl)(3-stearamidopropyl)-14-azaneyl)propane-1-sulfonate (1:1) at 90° C.

In addition, a mixture of piperazine-based surfactant of Formula (I) and zwitterionic surfactant of Formula (IV) in a 1:1 ratio in distilled water (with each surfactant at a concentration of 5 wt %) in the presence of CaCl$_2$ at a concentrations of 10 wt %, was investigated at a constant shear rate of 35 s$^{-1}$. As shown in FIG. 2, the viscosity of the mixture exhibited a shear stable viscosity of above about 340 centipoise (cp) at 90° C. for at least 60 minutes (min).

Figure 3:
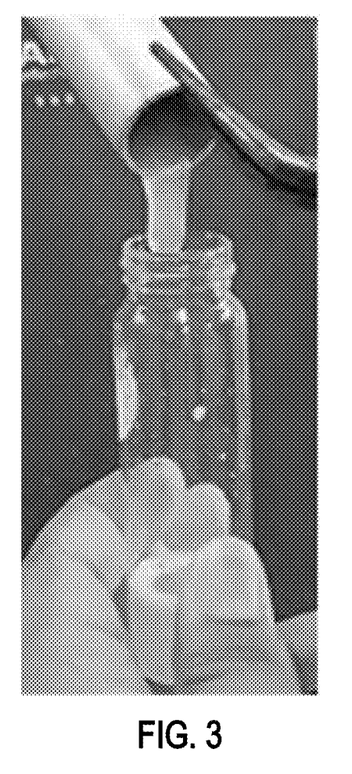
FIG. 3 is a photograph illustrating the lipping properties of the mixture of piperazine-based surfactant and zwitterionic surfactant.

Furthermore, FIG. 3 shows that this mixture exhibited excellent lipping behavior.

Accordingly, the viscosity properties of the mixture of piperazine-based surfactant of Formula (III) and zwitterionic surfactant of Formula (IV) are suitable for a fracturing fluid system to transport the proppants inside a fracture of a hydrocarbon-containing formation.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

What is claimed:

1. A method of treating a hydrocarbon-bearing formation comprising:
    injecting a fracturing fluid in the hydrocarbon-bearing formation, the fracturing fluid comprising:
        a first surfactant having a structure represented by Formula (I):

where m is an integer ranging from 2 to 3, and n, o, and k are each, independently, integers ranging from 2 to 10,
        a second surfactant having a structure represented by Formula (II):

wherein $R^2$ is a $C_{15}$-$C_{27}$ hydrocarbon group or a $C_{15}$-$C_{29}$ substituted hydrocarbon group, $R^3$ is a $C_1$-$C_{10}$ hydrocarbon group, and p and q are each, independently, an integer ranging from 1 to 4, and
    an alkaline activator,
        wherein the fracturing fluid is configured to transport a proppant into the hydrocarbon-bearing formation.

2. The method according to claim 1, wherein the first surfactant has a structure represented by Formula (III):

3. The method according to claim 1, wherein the second surfactant has a structure represented by Formula (IV):

4. The method according to claim 1, wherein the fracturing fluid comprises 1 to 15 wt. % of the second surfactant.

5. The method according to claim 1, wherein the fracturing fluid comprises 1 to 15 wt. % of the second surfactant.

6. The method according to claim 1, wherein the fracturing fluid comprises 5 to 30 wt. % of the alkaline activator.

7. The method according to claim 6, wherein the alkaline activator and the surfactants are in a weight ratio of 30:1 to 1:3.

8. The method according to claim 1, wherein the proppant is selected from the group consisting of gravel, sand, bauxite, and glass beads.

9. The method according to claim 1, wherein the fracturing fluid has a viscosity of at least about 300 cp at 90° C.

10. The method according to claim 1, further comprising injecting a stimulation fluid.

11. The method according to claim 1, further comprising recovering hydrocarbons from the hydrocarbon-bearing formation.

* * * * *